United States Patent
Houtman et al.

(10) Patent No.: US 6,552,725 B1
(45) Date of Patent: Apr. 22, 2003

(54) HEURISTIC METHOD FOR ADAPTIVE SUBDIVISION OF COONS PATCHES FOR RENDERING

(75) Inventors: Reynold Houtman, Ottawa (CA); Haroon Sheikh, Cupertino, CA (US); Chris Whytock, Seattle, WA (US)

(73) Assignee: Corel Corporation (CA)

( * ) Notice: Subject to any disclaimer, the term of this patent is extended or adjusted under 35 U.S.C. 154(b) by 0 days.

(21) Appl. No.: 09/547,935

(22) Filed: Apr. 11, 2000

(51) Int. Cl.[7] .............................................. G06T 15/00
(52) U.S. Cl. ....................................................... 345/423
(58) Field of Search ................................ 345/419, 420, 345/619, 620, 423, 424, 426, 427

(56) References Cited

U.S. PATENT DOCUMENTS

| | | | |
|---|---|---|---|
| 5,029,096 A | 7/1991 | Itaba | 364/474.29 |
| 5,063,375 A | 11/1991 | Lien et al. | 340/703 |
| 5,359,712 A | 10/1994 | Cohen et al. | 395/161 |
| 5,377,320 A | 12/1994 | Abi-Ezzi et al. | 395/163 |
| 5,544,291 A | 8/1996 | Gilley et al. | 395/123 |
| 5,581,672 A | 12/1996 | Letcher, Jr. | 395/120 |
| 5,745,666 A | 4/1998 | Gilley et al. | 395/128 |
| 5,828,467 A | 10/1998 | Suzuki | 358/428 |
| 5,856,828 A | 1/1999 | Letcher, Jr. | 345/420 |
| 5,995,109 A | 11/1999 | Goel et al. | 345/423 |
| 5,999,188 A | 12/1999 | Kumar et al. | 345/423 |
| 6,014,472 A | * 1/2000 | Minami et al. | 345/426 |

OTHER PUBLICATIONS

Smooth Shading, Adobe Technical Note #5600 Oct. 10, 1997 Adobe Systems Incorporated pp. 13–78.

* cited by examiner

Primary Examiner—Phu K. Nguyen
(74) Attorney, Agent, or Firm—Hayes Soloway P.C.

(57) ABSTRACT

The invention discloses a method for preparing Coons patches for rendering. The Coons patch is examined for folds and any regions containing folds are isolated from regions that do not contain folds. The rendering method appropriate for fold containing and non-fold containing regions can then be selected. The rendering method appropriate for fold containing regions requires extensive computation compared to that for non-fold containing regions. By isolating the regions containing folds, the invention allows the avoidance of the extensive computation for the non-fold containing regions. Thus, the invention enables reduction of the amount of computation that is required during rendering.

22 Claims, 8 Drawing Sheets

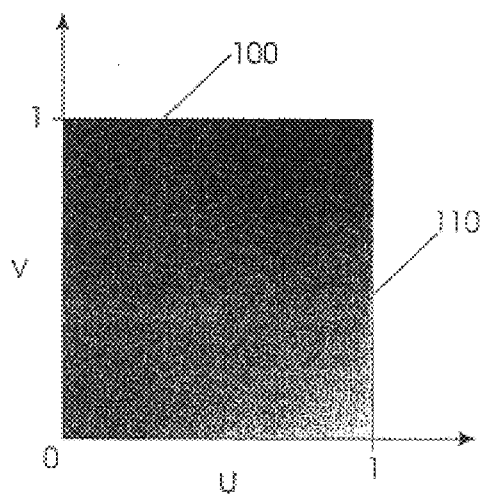
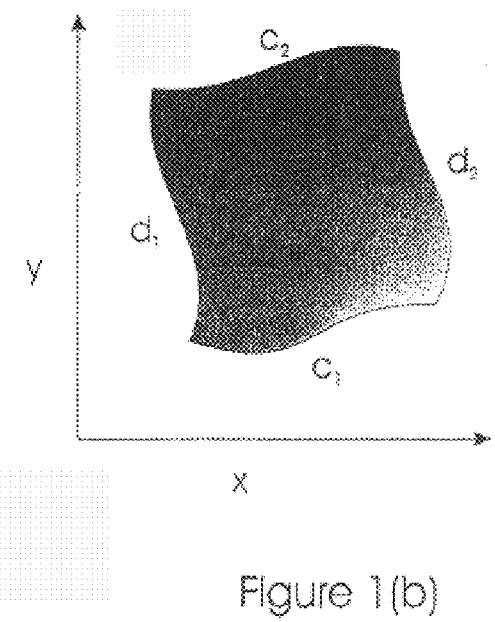
Figure 1(a)
Figure 1(b)
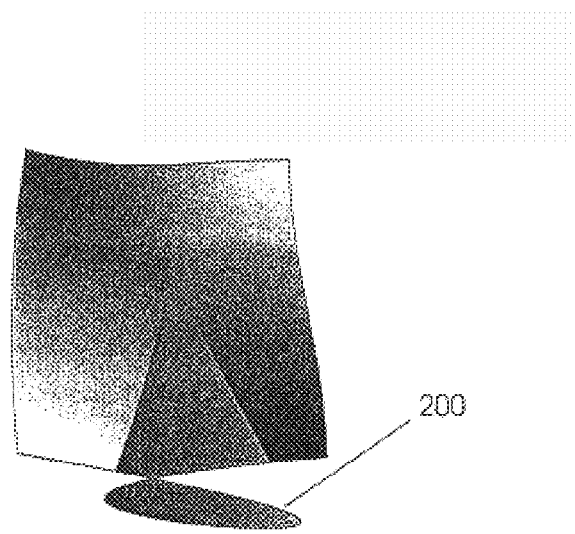
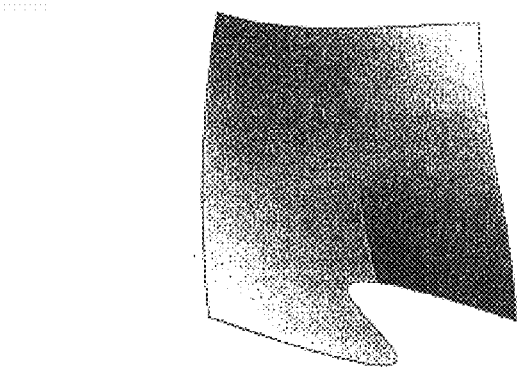
Figure 2(a)
Figure 2(b)

HEURISTIC METHOD FOR ADAPTIVE SUBDIVISION OF COONS PATCHES FOR RENDERING

FIELD OF THE INVENTION

The invention relates generally to the area of computer graphics. It more particularly relates to the use of Coons patches to represent surfaces and the preparation of these patches prior to the rendering of a raster image.

BACKGROUND OF THE INVENTION

Computer graphics have become an integral part of many people's lives. The use of graphics in computers has risen dramatically since the use of graphical interfaces for both operating systems and the programs that run on them became commonplace. The incorporation of more detailed graphics has also been a major factor in the rapid increase in memory capacity and processing power in the computer industry. The increased use of graphics and more powerful computing resources have also increased the expectations of the end user. Computer generated graphics must be of high quality with little if any noticeable degradation of image compared to the 'real thing'. These demands for high quality graphics have penetrated all levels of computing. This places great demands on the computer systems that are running these graphics intensive programs.

An integral step in the production and manipulation of computer graphics is rendering. In this step an image is often converted into polygons with linear line segments for edges. When the image is in this form the edges of the polygon can be manipulated numerically and the image is altered on the display. However, rendering of an image is not always straight forward. The image should be prepared for rendering such that it appears that same after it is rendered.

Surfaces in a graphics image are often represented by a mesh of surface 'patches'. A Coons patch can be used for this representation. A Coons patch is a specialization of a bicubic (Bezier) patch that is bounded by four arbitrary curves.

An $n^{th}$-order Bezier curve is defined parametrically by the following equation: where $p_i$ are the control points.

$$\sigma(t) = \sum_1^n p_i \left( \frac{n!}{i!(n-i)!} \right) (t^i (1-t))^i$$

A Coons patch is a mapping of points in a unit square in (u,v) co-ordinate space, FIG. 1(a), to a patch in (x,y) co-ordinate space, FIG. 1(b). The patch in (x,y) co-ordinate space is bounded by four cubic Bezier curves; $c_1$, $c_2$, $d_1$ and $d_2$. Line 100 (FIG. 1(a)) is a line of constant-u while line 110 is a line of constant-v. The (v=0) and (v=1) edges of the unit square map to curves $c_1$ and $c_2$, respectively. Similarly the (u=0) and (u=1) edges map to curves $d_1$ and $d_2$, respectively. Following the notation used in documentation of Adobe Postscript Coons patch fills (Smooth Shading, Adobe Technical Note #5600, Oct. 10, 1997, Adobe Systems Incorporated), the mapping from a point (u,v) to a point (x,y) equals $$S(u,v) = (S_x(u,v), S_y(u,v))$$

and is given by the equations $$S_c(u,v) = (1-v)*c_1(u) + (v)*c_2(u)$$

$$S_d(u,v) = (1-u)*d_1(v) + (u)*d_2(v)$$

$$S_b(u,v) = (1-v)*[(1-v)c_1(0) + (u)*c_1(1)] + (1-v)*[(1-u)c_1(0) + (u)*c_2(1)]$$

$$S = S_c + S_d - S_b$$

Surfaces patches are used to represent the shape, shading and colours of surfaces. The surface whose shape these patches are representing will quite likely have some contouring. This may take the form of slight waves in the surface or it may take the form of folds.

A Coons patch may contain regions that contain folds which will cause one part of the patch to lie on top of the other. A fold is defined as a region in (x,y) co-ordinate space in which multiple points in (u,v) co-ordinate space map to the same point in (x,y) space. Two Coons patches that contain folds are shown in FIG. 2. The fold in FIG. 2(a) is created by a loop (200) in the patch edge curve while the fold in FIG. 2(b) is created by the edge bending back on itself.

Because a fold maps several points from one co-ordinate space to a single point in another co-ordinate space there may be errors in point priority. Point priority is defined as follows. Assume points $(u_1, v_1)$ and $(u_2, v_2)$ in (u,v) co-ordinate space map to the same point in (x,y) co-ordinate space. The point $(u_1, v_1)$ has a higher priority than point $(u_2, v_2)$ if $v_3 > v_1$ or if $v_2 = v_1$ and $u_2 > u_1$. While the presence of folds gives Coons patches a 3-D appearance it is not a 3-D surface as the point priority is determined by a 2-D quantity. The mapping of points associated with a fold can cause point priority errors during rendering that will result in a noticeable reduction in image quality. Regions that do not contain folds are referred to as a flat.

A Coons patch can also used to represent the colours of a surface. A colour is assigned to each of the corners of the unit square in (u,v) co-ordinate space and colours inside the square are calculated by bilinear interpolation of the corner colours. The colour of a point in (x,y) space is then determined by the colour at the (u,v) point mapped to it. When multiple points in (u,v) space map to a single point in (x,y) space the colour of that point in (x,y) space is taken to be the colour of the (u,v) source point having the highest priority.

These are several methods that have been used to prepare a Coons patch for rendering. The patch can be subdivided along curves of constant-u and constant-v. This method is illustrated in FIG. 3. These lines in (u,v) co-ordinate space map to Bezier curves in (x,y) co-ordinate space. The sub-patches are also Coons patches. Colours at the new corner points of the sub-patches are calculated from the original patch colours by bilinear interpolation in (u,v) co-ordinate space. Patch subdivision is terminated when the patch shape and colour meet some linearity criteria across the patch and/or when the sub-patch size, as measured by its bounding rectangle, falls below a given threshold. This threshold is typically a small multiple of the dimensions of a raster image pixel. The sub-patches can then be approximated as quadrilaterals and rendered with Gouraud shading (i.e. bilinear colour interpolation). This method is computationally intensive as the resultant sub-patches, which are converted to polygons for rendering are very small.

A method of rendering bicubic patches using Coons patch approximations was disclosed in U.S. Pat. No. 5,063,375 of Lien et. al., issued on Nov. 5, 1991. Multiple single-pixel-wide Bezier curves are drawn to render the surface. The curves are drawn close enough to one another that there are no gaps between them. Each curve is drawn with the v-co-ordinate fixed. The v-co-ordinate is stepped from zero to one with the step size determined dynamically to ensure that are no gaps between the curves. For each curve the endpoint colours are determined by interpolation between corner colours. Pixel colours along the curve are then interpolated between the endpoint colours according to the u-value at each point along the curve.

Goel et.al. disclose a method for rendering surfaces using Bezier patches in U.S. Pat. No. 5,995,109 issued on Nov. 30, 1999. The proposed method is able to render patches with contours but it does not discuss the presence of folds in the patches. The patch is first tested for flatness. If the patch is flat it is divided into triangles for rendering. If the patch is not found to be flat i.e. the patch normal deviates from vertical by more than a prescribed amount, it is divided into sub-patches. The testing and division is continued until the sub-patches are considered to be flat. Once the patches are found to have the desired surface quality they are converted into sets of triangles for which "established rendering hardware exists".

The rendering of a Coons patch that contains fold involves considerable computational effort. This computation is associated with the subdivision of the Coons patch or part of a Coons patch containing folds. It is also associated with maintaining point priorities throughout. This is not the case for flat patches. Therefore there is a need to reduce the computation associated with rendering Coons patches that contain folds. A reduction in the computation effort will improve performance.

SUMMARY OF THE INVENTION

The invention discloses a method for preparing Coons patches for rendering. The Coons patch is examined for folds and any regions containing folds are isolated from regions that do not contain folds. The rendering method appropriate for fold containing and non-fold containing regions can then be selected. The rendering method appropriate for fold containing regions requires extensive computation compared to that for non-fold containing regions. By isolating the regions containing folds, the invention allows the avoidance of the extensive computation for the non-fold containing regions. Thus, the invention enables reduction of the amount of computation that is required during rendering.

In accordance with an embodiment of the invention a system for preparing a Coons patch having one or more folds, within one or more regions of the Coons patch, that are created by the shape of the edges of the Coons patch for rendering to a raster image is provided. The system comprises; means for determining the location of the one or more regions of the Coons patch that include one or more folds, means for isolating said one or more regions of the Coons patch that includes one or more folds from those regions of the Coons patch that do not include folds, means for subdividing said one or more regions of the Coons patch that include one or more folds, and means for subdividing those regions of the Coons patch that do not include folds.

In accordance with another embodiment of the invention a method for preparing a Coons patch having one or more folds, within one or more regions of the Coons patch, that are created by the shape of the edges of the Coons patch for rendering to a raster image is provided. The method comprises the steps of: determining the location of the one or more regions of the Coons patch that include one or more folds, isolating said one or more regions of the Coons patch that include one or more folds from those regions of the Coons patch that do not include folds, subdividing said one or more regions of the Coons patch that include one or more folds, and subdividing those regions of the Coons patch that do not include folds.

In accordance with another embodiment of the invention a method for determining the location of folds in a Coons patch which has edge curves that are defined by a parametric equation wherein two edges are parallel to lines of constant-v and two edges are parallel to lines of constant-u and the Coons patch is located in u,v co-ordinate space is provided. The method comprises the steps of; determining the derivative of the parametric equation that defines the edge curves of the Coons patch having folds, determining the endpoints of the portion of the edge curve which includes one or more folds, determining the location of points on the edge curve where the derivative of the parametric equation is equal to zero, and comparing the location of points of the edge curve where the derivative of the parametric equation is zero, the endpoints of the portion of the edge curve that includes one or more folds and the endpoints of the edge curve with analogous points of curves known to create folds.

In accordance with another embodiment of the invention a method of isolating the regions of a Coons patch that includes folds from the regions of the Coons patch that do not include folds wherein the Coons patch has two edges that are parallel to lines of constant-v and two edges that are parallel to lines of constant-u wherein u and v define the co-ordinate space is provided. The method comprises the steps of; determining the endpoints of the portion of the edge which includes one or more folds, expanding the range of u-values that define the endpoints of the portion of the edge curve which includes one or more folds and dividing the Coons patch along lines of constant-u such that the regions of the Coons patch that includes folds are isolated from the regions of the Coons patch that do not include folds.

In accordance with another embodiment of the invention a method for rendering a Coons patch having edge curves is provided. The method comprising the steps of; determining presence of a fold on a first edge curve, when a fold is found, isolating a fluid containing region of the Coons patch containing the fold from a non-fold containing region of the Coons patch containing no fold, rendering the fold containing region using a first method which is capable of rendering the fold, and rendering the non-fold containing region using a second method which is simpler than the first method.

Other aspects and advantages of the invention, as well as the structure and operation of various embodiments of the invention, will become apparent to those ordinarily skilled in the art upon review of the following description of the invention in conjunction with the accompanying drawings.

BRIEF DESCRIPTION OF THE DRAWINGS

The invention will be described with reference to the accompanying drawings, wherein:

FIG. 1(a) is a unit square in (u,v) co-ordinate space;

FIG. 1(b) is a Coons patch in (x,y) co-ordinate space with four arbitrary cubic Bezier curves, $c_1$, $c_2$, $d_1$ and $d_2$, for edges;

FIG. 2(a) is a Coons patch that contains a fold that has been created by a loop in the edge curve, clipped to the patch bounding curves;

FIG. 2(b) is a Coons patch that contains a fold created when the constant-v edge curve has folded back on itself, clipped to the patch bounding curves;

DETAILED DESCRIPTION OF THE INVENTION

Figure 3:
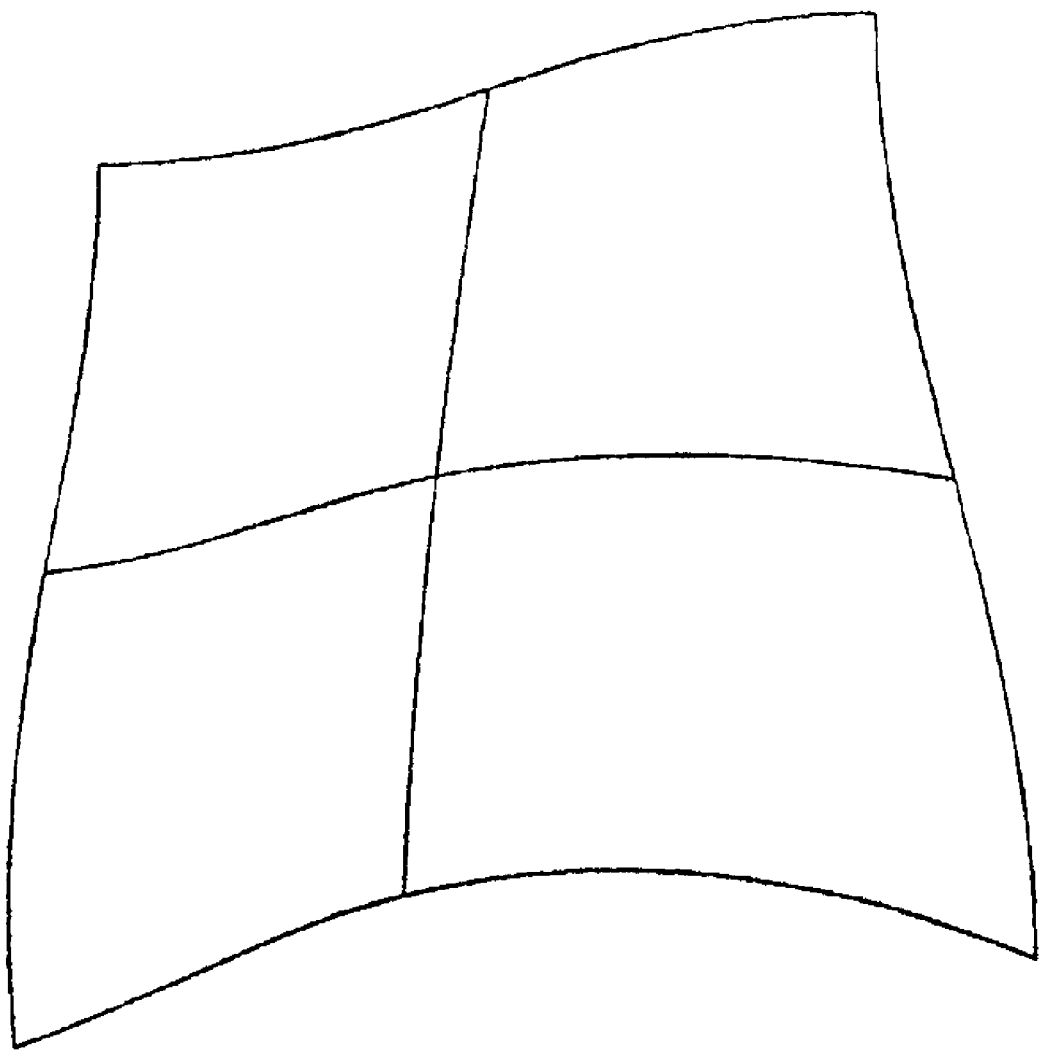
FIG. 3 is a Coons patch that has been subdivided along lines of constant-u and constant-v into four sub-patches.
Figure 4:
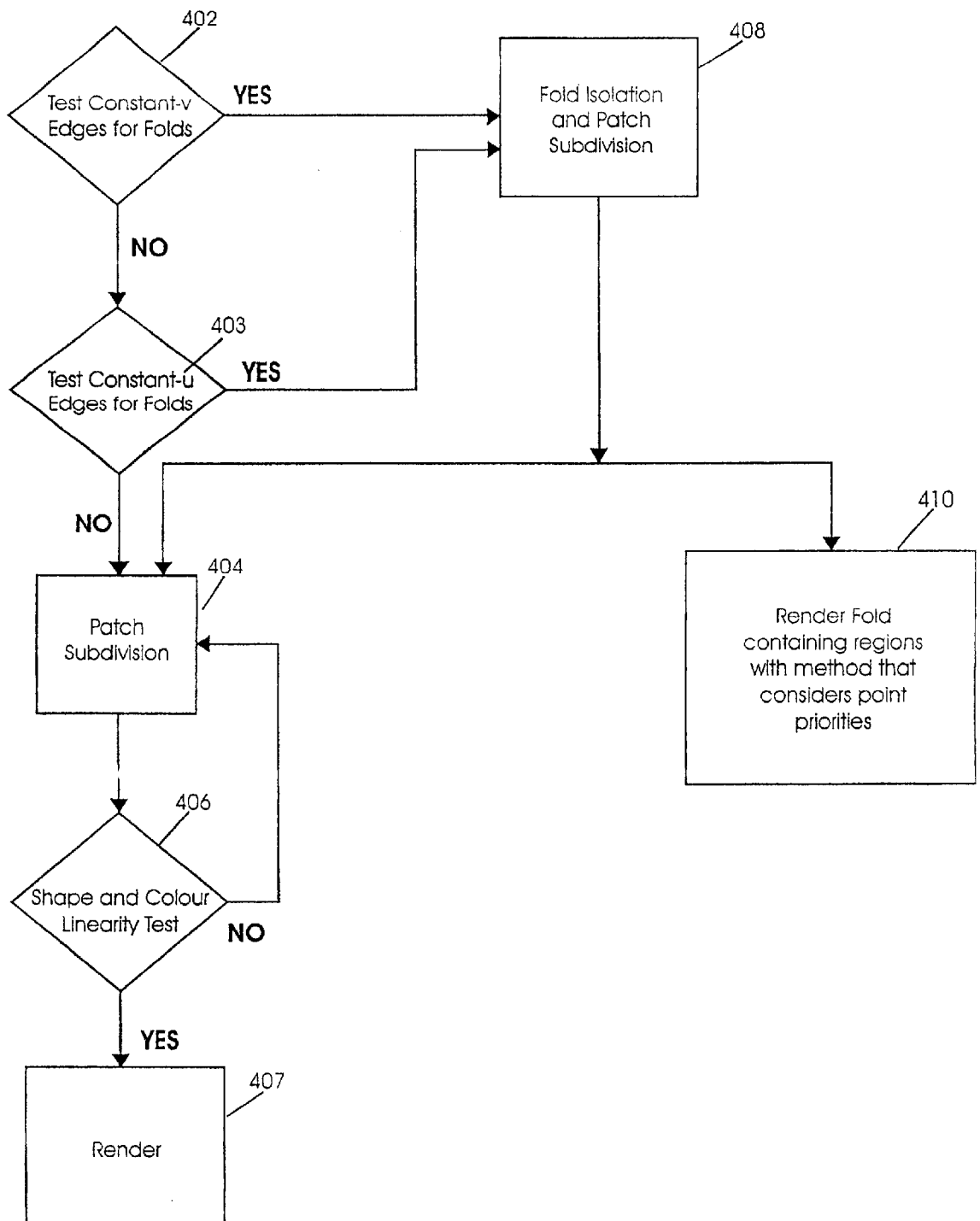
FIG. 4 is a flow chart of the basic fold evaluation procedure.

First, an overview of the invention is provided. The invention provides a method of preparing Coons patches for rendering. FIG. 4 is a block diagram showing the basic elements of the procedure for preparing a Coons patch for rendering. The Coons patches are examined for the presence of folds in the constant-v edges 402, which have been found to create the most visible defects during rendering using patch subdivision. If there are no folds due to the shape of the constant-v edges, a check is performed to determine whether there are folds due to the shapes of the constant-u edges 403. If no folds are found the patches are subdivided 404 and tested for shape and colour linearity 406 until they can be rendered 407 as Gouraud-shaded polygons, without concern for point priorities. If a fold is found at step 402 its shape and the range over which it extends are determined 408. The regions that contain folds are isolated and can be rendered using methods that consider the point priorities of a region that contain folds 410. Regions that are identified as not containing folds can then be rendered using a simpler method 404, reducing the computational effort required.

Figure 5A:
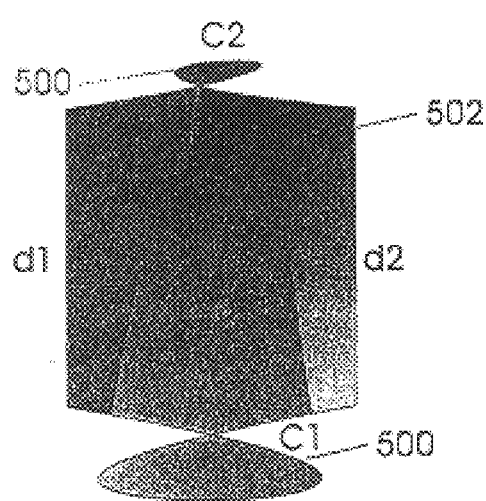
FIG. 5(a) is a Coons patch with fold creating loops in the constant-v edges of the patch, clipped to the patch bounding curves.
Figure 5B:
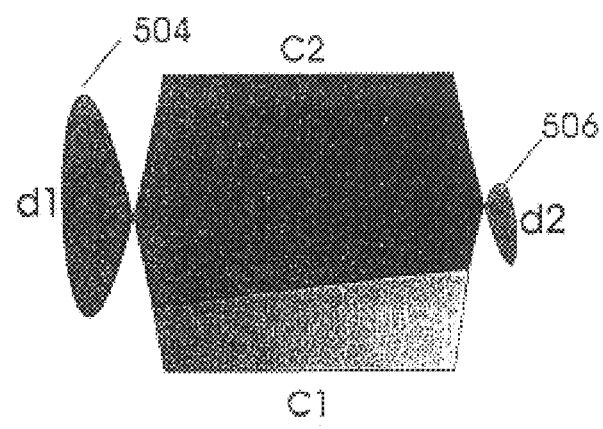
FIG. 5(b) is a Coons patch with fold creating loops in the constant-u edges of the patch, clipped to the patch bounding curves.

With reference to FIGS. 1(a) and 1(b) a Coons patch with have two edges that are normally parallel to lines of constant-u and two edges that are nominally parallel to lines of constant-v. Fold regions created by loops in the constant-v and constant-u edges of a patch are illustrated in FIGS. 5(a) and 5(b), respectively. It is apparent from these figures that the rendered image quality is a function of which edge contains the fold. In FIG. 5(a) there is a large region 502 of poor quality stemming from the fold which is created by loops 500 on the constant-v edges of the patch. The patch in FIG. 5(b) is of reasonably high quality with no regions of poor quality as found in FIG. 5(a). The fold creating the loops 504 and 506 in the $d_1$ and $d_2$ curves, respectively, on the constant-u edges have little impact on image quality. This asymmetry in the effects of folds has been found to be a characteristic of 2-D Coons patches when rendered by subdivision into polygons having a size greater than a single pixel, with a single priority assigned to each sub-patch and the sub-patches rendered in the order of their assigned priorities. In this case step 403 in FIG. 4 may be omitted. A rendering method for fold containing regions that performs priority calculations on a per-pixel rather than a per-polygon basis will not distinguish between folds due to constant-v and constant-u edges. Accordingly, in this case, it is desirable to test both edges as shown at steps 402 and 403 in FIG. 4.

Figure 6:
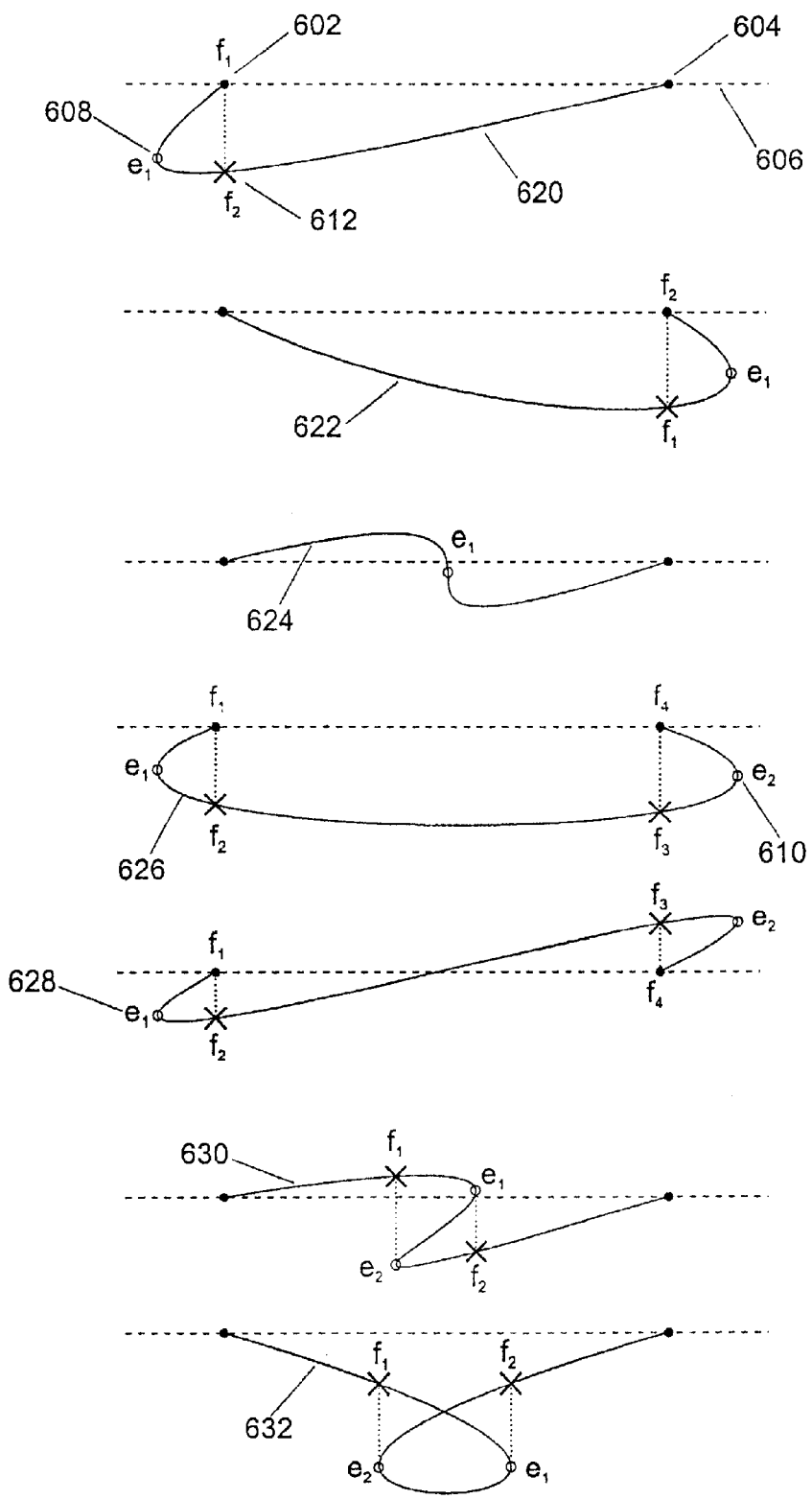
FIGS. 6 and 6A illustrate edge curves that may produce folds in a Coons patch.
Figure 6A:
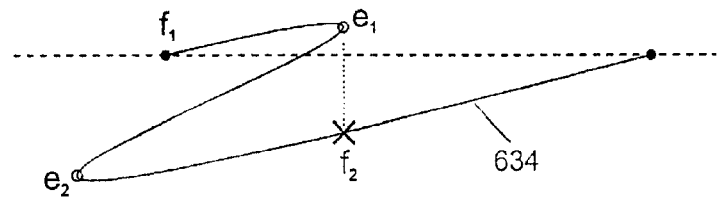
Figure 6A:
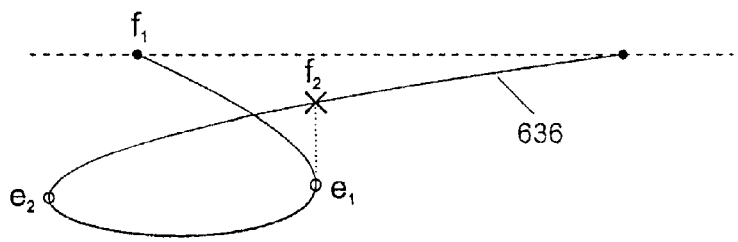
Figure 6A:
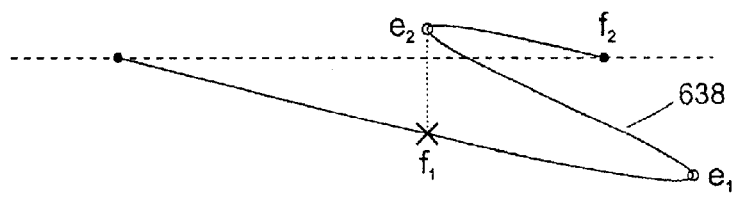
Figure 6A:
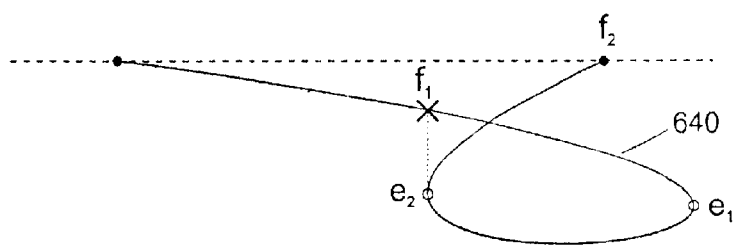
Figure 6A:
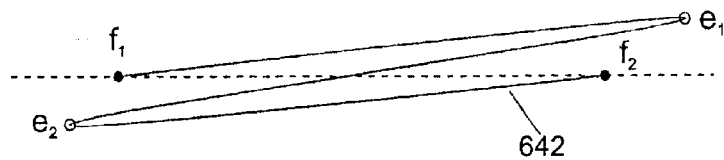
Figure 6A:
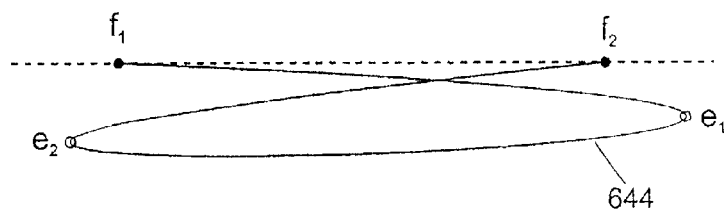

The first step in the subdivision of Coons patches as outlined in the current invention is the determination of the existence of folds along the constant-v edges of the patch. This is procedure 402 in FIG. 4. FIGS. 6 and 6A show thirteen curves that illustrate eight general types of patch edge curves that may or may not produce folds in the patch. Curve 620 is a curve that produces a single fold. This curve will be used to illustrate the first three steps of the subdivision procedure i.e. the determination of curve shape.

A curve that may or may not contain folds is rotated about its (u=0) endpoint 602 such that the (u=1) endpoint 604 is to right of the (u=0) endpoint 602 and both endpoints lie on a horizontal line 606. The endpoints of the curve section that contains folds are labelled $f_1$ (602) and $f_2$ (612). In the current example point $f_1$ is coincident with the curve endpoint 602. The subscripted index increases with increasing u-value. In the case of a Bezier curve, the curve type that bounds a Coons patch, this rotation can be performed by simply rotating the control points $p_1$ that are used to define the curve. The x co-ordinates of the rotated control points are calculated as the parametric equation for the x-co-ordinates of points on the curve (x=f(u)) will be used in subsequent calculations. The y-co-ordinates have not been calculated as they are not used.

In the second step the derivative, dx/du, of the parametric equation x=f(u) is determined. The u-values of any points where this derivative is equal to zero (zero-derivative points) are then found. The zero-derivative point of curve 620 is labelled 608 ($e_1$). In this case of two zero-derivative points the second point is labelled $e_2$ (610 of curve 626) The subscripted index of the zero-derivative labels($e_i$) increases with increasing u-value. This step is relatively straight forward as the original equation (x=f(u)) is cubic and its derivative is quadratic. If there are no real-valued roots greater than zero and less than one, the curve does not contain any folds and the following steps are not performed.

Third, the location(s) (x-co-ordinate) of zero-derivative points are compared to the locations of the curve endpoints (602 and 604) and to each other, if there are multiple zero-derivative points. This comparison allows the shape of the patch edge curve to be determined.

Curves 620, 622 and 624 contain a single zero-derivative point. If the zero-derivative point (extrema) is to the left of the left curve endpoint, then the curve is the same type as curve 620. If the extrema is to the right of the right curve endpoint the curve is the same type as curve 622 and finally if the extrema is located between the endpoints of the curve if it is the same type as curve 624.

The situation becomes slightly more complicated when there are two zero-derivative points. The remainder of the curves of FIG. 6 have two zero-derivative points. Now the x-co-ordinate of each extrema is compared to the curve endpoints. First, if $e_1$ is to the left of the left curve endpoint and $e_2$ is to the right of the right curve endpoint the curve is the same type as curves 626 and 628. If both extrema are located between the curve endpoints the curve is the same type as curves 630 and 632. If the point $e_1$ is between the curve endpoints and $e_2$ is to the left of the left endpoint, the curve is the same type as curves 634 and 636. If $e_2$ is located between the curve endpoints and $e_1$ is to the right of the right endpoint the curve is the same type as curves 638 and 640. Finally, if $e_1$ is to the right of the right curve endpoint and $e_2$ is located to the left of the left curve endpoint the curve is the same type as curves 642 and 644.

Now that the shape of the constant-v patch bounding curve is known lines of constant-x are drawn through the zero-derivative point(s) and/or the curve endpoints (depending on the curve shape). The u-values at the points where the lines of constant-x intersect the curves are found. The range of u-values bounding the projection of the loop or bend in the curve is given by some combination of the above intersection points and/or the curve endpoints. The procedure used to determine the range of u-values containing the fold is a function of the curve type, based on the types shown in FIG. 6.

The u-value for a point p on the curve can be written as $u(p)$. For curves of the same type as curve 620 there is a single fold that starts at the left curve endpoint (u=0) and ends at $u=(f_2)$. The point $f_2$ is located between $e_1$ and the right endpoint, and has the same x-co-ordinate as the left endpoint.

For curves of the same type as curve 622 there is a single fold that starts at $u(f_1)$ and ends at the right curve endpoint (u=1). The point $f_1$ is located between the left endpoint and $e_1$, and has the same x-co-ordinate as the right endpoint. There is no fold for curves that are the same type as curve 624.

For curves of the same type as curves 626 and 628 there are two folds present in the Coons patch. The first fold starts at the left curve endpoint (u=0) and ends at $u(f_2)$, where $f_2$ is the point between $e_1$ and the right endpoint which has the same x-co-ordinate as the left endpoint. The second fold starts at $u(f_3)$ and ends at the right curve endpoint (u=1), where $f_3$ is the point between the left endpoint and $e_3$ which has the same x-co-ordinate as the right endpoint.

For curves of the same type as curves 630 and 632 that is one fold. This fold starts at $u(f_1)$ where $f_1$ is the point between the left endpoint and $e_1$ which has the same x-co-ordinate as point $e_2$. The fold ends at $u(f_2)$, where $f_2$ is the point between $e_2$ and the left endpoint which has the same x-co-ordinate as point $e_1$.

For curves of the same type as curves 634 and 636 there is one fold. This fold starts at the left endpoint (u=0) and ends at $u(f_2)$, where $f_2$ is the point between $e_2$ and the left endpoint which has the same x-co-ordinate as point $e_1$.

For curves of the same type as curves 638 and 640 there is one fold. This fold starts at $u(f_1)$ where $f_1$ is the point between the left endpoint and $e_1$ which has the same x-co-ordinate as point $e_2$ and ends at the right curve endpoint (u=1).

For curves of the same type as curves 642 and 644 there is one fold region that extends over the entire curve range i.e. from u=0 to u=1.

The u-values of fold endpoints not coincident with curve endpoints are found by solving the parametric equation for the x-co-ordinates of points on the curves for the u-value in the appropriate range giving an x-co-ordinate of the extrema or endpoint, as described above for each case. The solution is found using numerical methods to determine the roots.

It has been found that patch fold regions can extend beyond the ranges determined from the edge curve shapes described above. For this reason the range of u-values bounding the fold area that is determined above is expanded. In a preferred embodiment the u-value of the endpoint of the fold containing region is moved 10% of the distance to the corresponding edge curve endpoint (i.e. towards the u=0 end for the left endpoint and towards the u=1 end for the right endpoint). This has been found to be adequate in the majority of cases. Sub-patches are tested for folds after subdivision such that those containing folds will not be rendered as flat patches.

Finally, the procedure for detecting the presence of folds and determining their u-value range outlines above has only considered a single constant-v edge. In practice both constant-v edges are examined for the presence of folds. There may be up to two ranges of u-values containing folds for each edge. When ranges of u-values from the two edges overlap each other, these ranges are combined, resulting in up to three ranges of u-values that contain folds.

One motive for the use of the procedure outlined in the current invention is the minimization of the area of a fold containing Coons patch. The fold containing Coons patch has to be rendered with methods appropriate for fold containing regions as these methods include substantial subdivision and consideration is given to point priorities. Thus, minimizing the area of a fold containing Coons patch reduces the overall amount of computation during rendering.

It has been assumed that a fold containing region is the same as that determined at the constant-v curve. However, it has been found that the u-range of a fold containing region varies with the v-value. Therefore the area to be rendered as a fold containing region can be further reduced by first dividing the Coons patch along lines of constant-v i.e. it is divided into strips.

Figure 7A:
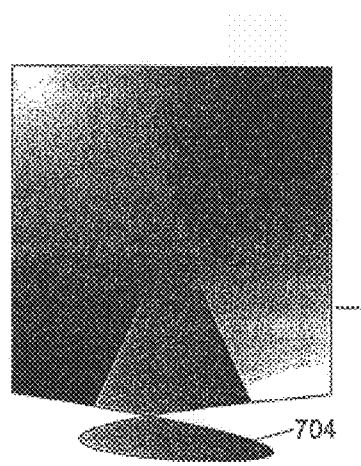
FIGS. 7(a), 7(b), 7(c), 7(d) and 7(e) depict a further refinement of the isolation of a fold within a Coons patch in which the patch is first subdivided along lines of constant-v.
Figure 7B:
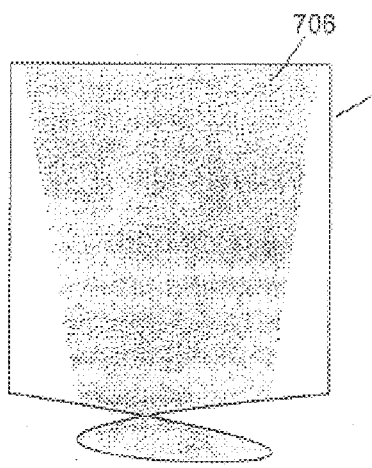
Figure 7C:
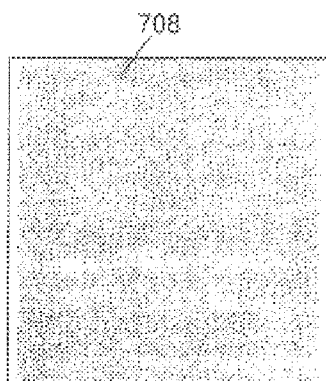
Figure 7D:
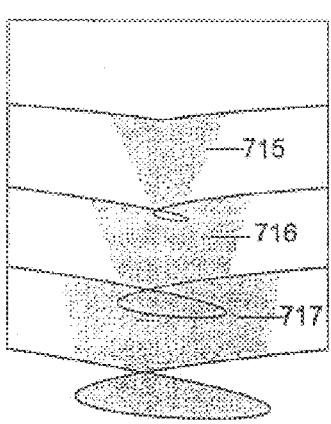
Figure 7E:
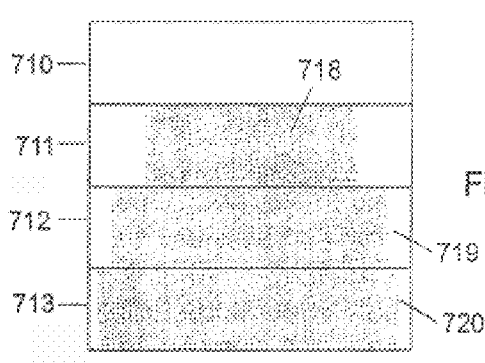

This procedure is illustrated in FIGS. 7(a) to 7(e). A patch 702 having a loop 704 in the (v=0) edge is shown in FIG. 7(a). FIGS. 7(b) and 7(c) show the regions 706, 708 in (x,y) and (u,v) co-ordinate spaces, respectively, that are determined to be fold containing areas using the method of the current invention. The original patch 702 is now divided into four equal strips 710–713 in (u,v) co-ordinate space as shown in FIG. 7(e). FIGS. 7(d) and 7(e) show the fold containing regions 715–717, 718–720 in (x,y) and (u,v) co-ordinate spaces, respectively. The strip edge curves are shown superimposed on FIG. 7(d). It is readily apparent from a comparison of FIGS. 7(b) and 7(d) or 7(c) and 7(e) that the size of the fold containing region can be reduced by first dividing the patch into strips along lines of constant-v.

The strips 710–713 are examined separately for the presence of folds and the range of u-values of the fold containing region is determined for each fold. The strip with the lowest v-value is examined and rendered first and that with the highest is examined and rendered last. Once the range of u-values that contain folds is determined the strips are divided along lines of constant-u into fold and non-fold containing regions. The Coons patch can now be rendered with methods that are appropriate for folds in constant-v containing and non-fold containing regions. In either case the point priority is taken into consideration.

Figure 8:
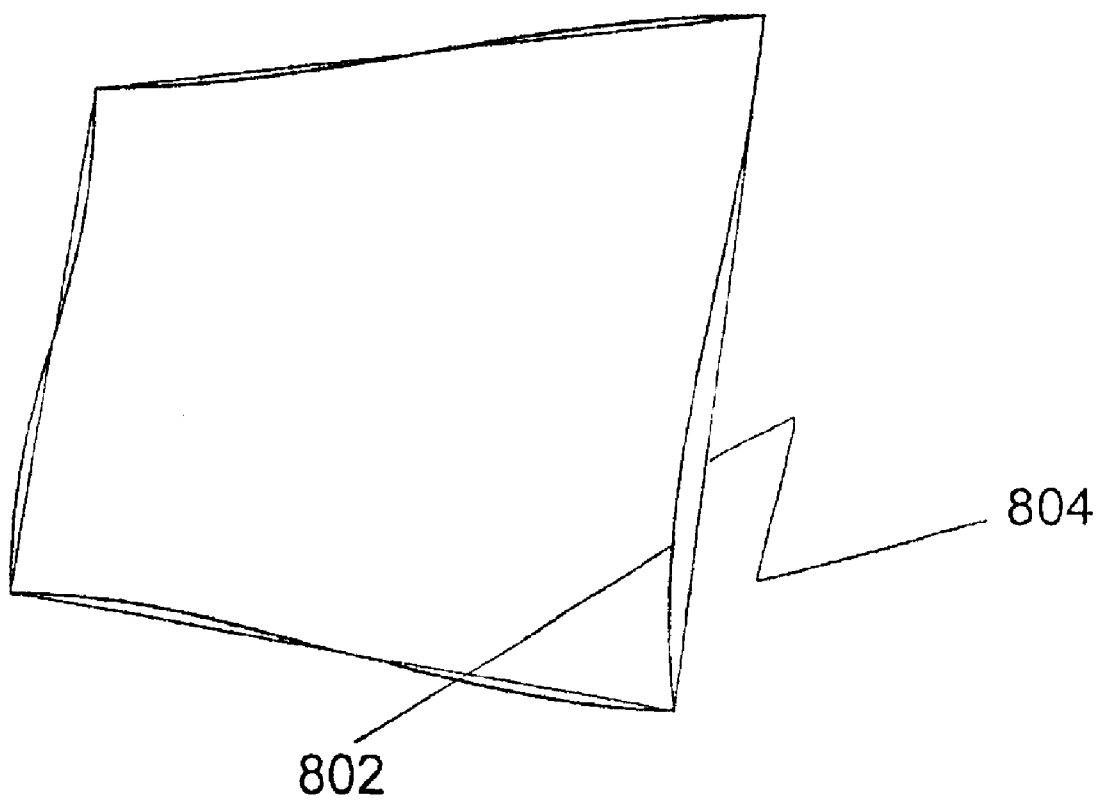
FIG. 8 is a quadrilateral polygon approximation of a sub-patch.

When there are no folds present in the constant-v edge curves the preparation of the patch for rendering is relatively straight forward. The Coons patch is recursively divided into sub-patches (404, FIG. 4) until the sub-patches can be approximated as Gouraud-shaded quadrilaterals. This is illustrated in FIG. 8 where the sub-patch 802 is approximated by Gouraurd quadrilateral 804. The sub-patches are then tested to determine the variation of shape and colour across the sub-patch (406, FIG. 4). If the sub-patch meets a pre-defined shape and colour uniformity criteria i.e. passes a linearity test or it is smaller than a given size threshold, which is usually a small multiple of the dimensions of a raster-image pixel, the sub-division is terminated. Otherwise the patch is further sub-divided.

Since the patch has only been tested for folds along the constant-v curve it may contain folds along the constant-u curves. For this reason the point priority of the sub-patches is considered such that the correct surface is visible after rendering. The patch can be assigned a single priority value to each sub-patch equal to the priority at a point in the patch not on a shared edge. The patches are then sorted with respect to the priority value. Finally, the patches are rendered from the lowest to highest priority.

The above method may not work well for the case where there is a fold in the constant-v edges of the patch because the priority ordering is first determined by the v-value and then by the u-value. If a patch is divided along a curve of constant-v, then points in the upper part of the (u,v) plane have higher priority than those in the lower portion of the (u,v) plane. Thus, the patch can be rendered with correct priority ordering by the lower-v sub-patch first, then the higher-v sub-patch. However, if the patch is divided along a curve of constant-u, points to the right of the division line in (u,v) space do not all have a higher priority than points to the left. In this case there is no single priority value for each sub-patch than can determine the relative orderings of pairs of points from the two sub-patches.

When either of the constant-v edges have loops and/or bends causing folds, the method described above may not give satisfactory results. Sub-patches that overlap will generally share some common range of v-values, so that the priority ordering of points from the two sub-patches may change across the patch areas i.e. the sub-patch surfaces appear to intersect. In these cases the priority ordering of points in each sub-patch relative to points in other sub-patches cannot be determined by the priority ordering of single points in the patches. To perform accurate rendering by patch sub-division it may be necessary to subdivide patches until the sub-patch size is equal to a single pixel.

A detailed description of the structure and operation of various embodiments of the invention is now provided. The patch could also be tested for folds along the edges of constant-u. The procedure is the same as that for constant-v edges except for two minor variations. First, the curve is rotated about the (v=0) endpoint so that the (v=1) endpoint is to the right of the (v=0) endpoint. Second, the v-co-ordinate is substituted for the u-co-ordinate in all of the other steps. By testing the constant-u edges for fold the sorting of sub-patches according to priority would not be required if were found that were no folds in the constant-u edges.

The method of approximately finding the location of folds can also be used when fold areas are rendered with other methods. In one such algorithm a 'priority buffer' is used in a method analogous to the 'z-buffer' that is used in a common 3-D rendering method. Patches are subdivided until they meet some subdivision termination criterion such as a linearity or size limit. Then, during rendering each quadrilateral, for each output pixel the (u,v) co-ordinates are determined by linear interpolation between the values at the patch corners. These are then compared with the values previously calculated and saved for that pixel (if any). The pixel and the new priority value are then written only if the new point has a higher priority. The priority buffer is initialized with a priority value preceding (0,0) before rendering begins. In flat regions no priority checking is required, reducing the number of calculations required for each pixel and eliminating the need for a priority buffer.

The procedure of preparing a Coons patch for rendering of the present invention may be implemented by any hardware, software or a combination of hardware and software having the above described functions. The software code, either in its entirety or a part thereof, may be stored in a computer readable memory. Further, a computer data signal representing the software code which may be embedded in a carrier wave may be transmitted via a communication network. Such a computer readable memory and a computer data signal are also within the scope of the present invention, as well as the hardware, software and the combination thereof.

While the invention has been described according to what is presently considered to be the most practical and preferred embodiments, it must be understood that the invention is not limited to the disclosed embodiments. Those ordinarily skilled in the art will understand that various modifications and equivalent structures and functions may be made without departing from the spirit and scope of the invention as defined in the claims. Therefore, the invention as defined in the claims must be accorded the broadest possible interpolation so as to encompass all such modifications and equivalent structures and functions.

What is claimed is:

1. A system for preparing a Coons patch having one or more folds, within one or more regions of the Coons patch, that are created by the shape of the edges of the Coons patch for rendering to a raster image comprising:

means for determining the location of the one or more regions of the Coons patch that include one or more folds;

means for isolating said one or more regions of the Coons patch that include one or more folds from those regions of the Coons patch that do not include folds;

means for subdividing said one or more regions of the Coons patch that include one or more folds; and means for subdividing those regions of the Coons patch that do not include folds.

2. The system as claimed in claim 1, wherein the Coons patch is a two dimensional Coons patch.

3. The system as claimed in claim 1, further comprising means for determining and storing point priority for a point in the Coons patch.

4. The system as claimed in claim 1, wherein the means for subdividing said one or more regions of the Coons patch that include one or more folds includes means for determining and storing a point priority for an end point of an edge of the Coons patch.

5. A method for preparing a Coons patch having one or more folds, within one or more regions of the Coons patch, that are created by the shape of the edges of the Coons patch for rendering to a raster image comprising the steps of:

determining the location of the one or more regions of the Coons patch that include one or more folds;

isolating said one or more regions of the Coons patch that include one or more folds from those regions of the Coons patch that do not include folds;

subdividing said one or more regions of the Coons patch that include one or more folds; and subdividing those regions of the Coons patch that do not include folds.

6. The method as claimed in claim 5, wherein the Coons patch is a two dimensional Coons patch.

7. The method as claimed in claim 5, further comprising the steps of determining and storing point priority for a point in the Coons patch.

8. The method as claimed in claim 5, wherein the means for subdividing said one or more regions of the Coons patch that include one or more folds includes means for determining and storing a point priority for an end point of an edge of the Coons patch.

9. A method of determining the location of folds in a Coons patch which has edge curves that are defined by a parametric equation wherein two edges are parallel to lines of constant-v and two edges are parallel to lines of constant-u and the Coons patch is located in u,v co-ordinate space comprising the steps of:

determining the derivative of the parametric equation that defines the edge curves of the Coons patch having folds;

determining the endpoints of the portion of the edge curve which includes one or more folds;

determining the location of points on the edge curve where the derivative of the parametric equation is equal to zero; and comparing the location of points of the edge curve where the derivative of the parametric equation is zero, the endpoints of the portion of the edge curve that includes one or more folds and the endpoints of the edge curve with analogous points of curves known to create folds.

10. The method according to claim 9 wherein the edges of the Coons patch that are parallel to lines of constant-v are examined for the presence of folds.

11. The method according to claim 9 wherein the edges of the Coons patch that are parallel to lines of constant-u are examined for the presence of folds.

12. A method of isolating the regions of a Coons patch that include folds from the regions of the Coons patch that do not include folds wherein the Coons patch has two edges that are parallel to lines of constant-v and two edges that are parallel to lines of constant-u wherein u and v defines the co-ordinate space comprising:

determining the endpoints of the portion of the edge which includes one or more folds;

expanding the range of u-values that define the endpoints of the portion of the edge curve which includes one or more folds; and dividing the Coons patch along lines of constant-u such that the regions of the Coons patch that include folds are isolated from the regions of the Coons patch that do not include folds.

13. The method according to claim 12 wherein the region of the Coons patch that is determined to include folds includes regions that include folds arising from both of the constant-v edges of the Coons patch.

14. The method according to claim 12 wherein the Coons is first divided along lines of constant-u.

15. The method as claimed in claim 12, wherein the Coons patch is a two dimensional Coons patch.

16. A method for rendering a Coons patch having edge curves, the method comprising the steps of:

determining presence of a fold on a first edge curve;

when a fold is found, isolating a fold containing region of the Coons patch containing the fold from a non-fold containing region of the Coons patch containing no fold;

rendering the fold containing region using a first method which is capable of rendering the fold; and rendering the non-fold containing region using a second method which is simpler than the first method.

17. The method as claimed in claim 16, wherein each point in the Coons patch has point priority and the first method uses point priority for rendering the fold containing region.

18. The method as claimed in claim 16, further comprising the step of subdividing the fold containing region of the Coons patch along a second edge curve.

19. The method as claimed in claim 16, wherein the Coons patch is a two dimensional Coons patch.

20. Computer readable media storing the instructions and/or statements for use in the execution in a computer of a method for preparing a Coons patch having one or more folds, the method comprising the steps of:

determining the location of the one or more regions of the Coons patch that include one or more folds;

isolating said one or more regions of the Coons patch that include one or more folds from those regions of the Coons patch that do not include folds;

subdividing said one or more regions of the Coons patch that include one or more folds; and subdividing those regions of the Coons patch that do not include folds.

21. Electronic signals for use in the execution in a computer of a method for preparing a Coons patch having one or more folds, the method comprising steps of:

determining the location of the one or more regions of the Coons patch that include one or more folds;

isolating said one or more regions of the Coons patch that include one or more folds from those regions of the Coons patch that do not include folds;

subdividing said one or more regions of the Coons patch that include one or more folds; and subdividing those regions of the Coons patch that do not include folds.

22. A computer program product for use in the execution in a computer of a method for preparing a Coons patch having one or more folds, the computer program product comprising:

means for determining the location of the one or more regions of the Coons patch that include one or more folds;

means for isolating said one or more regions of the Coons patch that include one or more folds from those regions of the Coons patch that do not include folds;

means for subdividing said one or more regions of the Coons patch that include one or more folds; and means for subdividing those regions of the Coons patch that do not include folds.

* * * * *